(12) United States Patent
Inoue et al.

(10) Patent No.: US 8,665,765 B2
(45) Date of Patent: Mar. 4, 2014

(54) WIRELESS COMMUNICATION APPARATUS

(75) Inventors: Hiroshi Inoue, Yokohama (JP); Takashi Miyake, Yokohama (JP); Tadayuki Watanabe, Yokohama (JP); Masahiro Baba, Yokohama (JP)

(73) Assignee: Kyocera Corporation, Kyoto (JP)

( * ) Notice: Subject to any disclaimer, the term of this patent is extended or adjusted under 35 U.S.C. 154(b) by 308 days.

(21) Appl. No.: 12/513,146

(22) PCT Filed: Oct. 25, 2007

(86) PCT No.: PCT/JP2007/070816
§ 371 (c)(1),
(2), (4) Date: Dec. 18, 2009

(87) PCT Pub. No.: WO2008/053778
PCT Pub. Date: May 8, 2008

(65) Prior Publication Data
US 2010/0103853 A1 Apr. 29, 2010

(30) Foreign Application Priority Data
Oct. 30, 2006 (JP) ................................. 2006-294072

(51) Int. Cl.
H04H 20/71 (2008.01)
H04B 7/00 (2006.01)

(52) U.S. Cl.
USPC .......................................... 370/312; 370/310

(58) Field of Classification Search
USPC ....................................................... 370/312
See application file for complete search history.

(56) References Cited

U.S. PATENT DOCUMENTS

| 2004/0224637 A1* | 11/2004 | Silva et al. ................... 455/63.4 |
| 2005/0201321 A1 | 9/2005 | Sinnarajah et al. ........... 370/328 |
| 2006/0153139 A1 | 7/2006 | Bae et al. ...................... 370/335 |
| 2007/0025295 A1 | 2/2007 | Kono ............................. 370/331 |
| 2008/0037500 A1* | 2/2008 | Andrus et al. ................ 370/342 |
| 2009/0022104 A1* | 1/2009 | Cherian et al. ................ 370/331 |

FOREIGN PATENT DOCUMENTS

| JP | 2006-512872 | 4/2006 |
| JP | 2006-339919 | 12/2006 |
| WO | WO 2005/027566 A2 | 3/2005 |

OTHER PUBLICATIONS

Chinese language office action dated Nov. 30, 2011 and its English language translation for corresponding Chinese application 200780040462.4.

* cited by examiner

Primary Examiner — Shripal Khajuria
(74) Attorney, Agent, or Firm — DLA Piper LLP (US)

(57) ABSTRACT

A wireless communication apparatus (100) includes a broadcast/multicast reception determination unit (120) for determining whether data distributed by broadcast/multicast is being received or not; a wireless session close process unit (140) for performing a wireless session close process when a wireless session close timer is expired; and a control unit (150) for controlling the wireless session close process unit to hold the wireless session close process activated based on expiration of the wireless session close timer until reception of data distributed by broadcast/multicast is completed, in case that it is determined that data distributed by the broadcast/multicast is being received when the wireless session close timer is expired.

2 Claims, 5 Drawing Sheets

WIRELESS COMMUNICATION APPARATUS

CROSS REFERENCE TO RELATED APPLICATION

This application is a national stage of international application No. PCT/JP2007/070816 filed Oct. 25, 2007. This application claims priority to and the benefit of Japanese Patent Application No. 2006-294072 filed Oct. 30, 2006, the entire content of which is incorporated herein by reference.

TECHNICAL FIELD

The present invention relates to a wireless communication apparatus, and more specifically, to a wireless communication apparatus which receives BCMCS transmitted from a wireless base station to a plurality of communication apparatus.

BACKGROUND ART

In a mobile communication system employing a code division multiple access (CDMA) scheme, various communication services using a high-speed data communication function, for example, 1×EV-DO (1× evolution-data only) has been provided. As an example of the communication service of 1×EV-DO, there is BCMCS (Broadcast and/or Multicast Services) transmitted to a plurality of wireless communication apparatus (for example, wireless communication terminals, wireless communication apparatus connected to a car navigation system, card modules and the like) simultaneously using a communication channel (see "CDMA2000 High rate Broadcast Packet Data Air Interface Specification (C.S0054-0 Version 1.0)-Section 1.4: Broadcast Channels", 3GPP2, February 2004).

As an example of the conventional art of the BCMCS, there is BCMCS of CDMA2000, which is an efficient data transmission scheme for users in a wide range within an 1×EV-DO communication area. Moreover, in the BCMCS of CDMA2000, a robust error correction code is added, and there is no retransmission control.

As BCMCS applications, it is performed to distribute BCMCS contents of large amount of data at late night, early morning, or a predetermined night time at which a communication traffic amount is significantly decreased, and it is also performed to timely distribute data in order to display local information or the like in a telop form. FIG. 4 is a time chart illustrating a basic operation for receiving BCMCS in the conventional art. As shown in FIG. 4, a base station (access network) AN transmits BCMCS periodically. A terminal (access terminal) AT previously registers a desired program in BCMCS, or acquires a BCMCS program table through unicast.

The terminal AT starts reception through a channel for BCMCS reception at a predetermined time based on the BCMCS program table, and receives BCMCS data. The base station AN transmits a BOM (Broadcast Overhead Message) before transmitting BCMCS data and at the same time with the BCMCS broadcasting. The BOM includes information for receiving BCMCS data such as physical channel information, sector information of BCMCS data, and the like. The terminal AT is on standby for a telephone call or data communication as usual and also tries to receive BOM at periods of about 3 seconds. A reception unit performs a normal slot reception (with standby every 5 seconds) operation, and also performs another slot reception (with standby every about 3 seconds) operation for BOM. Thus, a status of the reception unit at that time is referred to as a dual slotted mode. The terminal AT starts receiving BOM transmitted from the base station AN in the dual slotted mode, performs a process (pre-process) which is needed to receive BCMCS based on the BOM data, and thereafter starts receiving BCMCS data. When there is no change in a communication state of the terminal AT during receiving BCMCS data, the terminal AT successfully completes the reception as shown in FIG. 4. However, there are cases where the communication state of the terminal AT is changed due to a usual telephone call, data communication or the like, and a channel establishment state is changed according to the change of the communication state, which affects reception of BCMCS data. Below, a particular example which affects reception of BCMCS data in the convention art will be described with reference to a drawing.

DISCLOSURE OF THE INVENTION

Problems to be Solved by the Invention

FIG. 5 is a time chart illustrating a flow in which BCMCS reception fails in the conventional art. In communication states of a terminal AT, there are three communication states as follow:

IDLE: a state in which a wireless session is established;
Connected: a state in which packet data communication is being performed; and
Dormant: a state in which packet data communication is stopped.

As shown in FIG. 5, when a wireless connection is terminated since data communication is completed, a ppp_session_close timer is started. And, the PPP session is terminated/closed when the timer is expired. Here, the AT communication state is the connected state during wireless connection, but it is changed to the dormant state when the data communication is completed. And, when the PPP session is terminated/closed, UATI (Unicast AT Identifier) process and a session configuration (Session Config; system negotiation) process are performed. By these two processes, the AT communication state is changed to the idle state from the dormant state, and a channel which the terminal AT keeps is changed to channel B from channel A. The channel change occurs according to conditions of a base station, and therefore, the terminal AT basically cannot manage it. In the terminal AT, a wireless session close timer (Tsmp_close_timer) is started when the PPP session is terminated. When BCMCS reception is started just before the wireless session close timer is expired, there are cases where the channel is changed to a channel (channel=c) except for a BCMSC reception channel (in this case channel=x) due to UATI reacquisition and session configuration after time-out. When an unexpected channel change occurs according to a change of AT communication state, there is a problem that BCMCS reception becomes failure. Especially, since the wireless session close timer is generally set to 6 hours, for example, when a telephone conversation using the terminal AT is closed at 10 o'clock p.m., the wireless session close timer is expired at 4 o'clock a.m. of the next day after 6 hours, and a channel change occurs. Large amount of BCMCS data is mostly transmitted at night time, midnight or dawn, and there are many cases that BCMCS reception becomes failure due to the channel change at midnight or dawn as described above. In addition, since there is no retransmission control, a user needs to acquire the failed BCMCS data again through unicast where one user occupies a communication band (traffic channel), and therefore, there is a problem that traffic is increased.

It is an advantage of the present invention to provide a wireless communication apparatus which avoids a failure of BCMCS reception and improves a success rate.

SUMMARY OF THE INVENTION

To solve the problem, according to a wireless communication apparatus (a cellular phone or the like) includes:

(a broadcast/multicast reception unit for receiving broadcast/multicast;)

a broadcast/multicast reception determination unit for determining whether data distributed by broadcast/multicast is being received or not;

(a timer unit for detecting that a wireless session close timer enabled when a PPP session is terminated is expired and notifying the detection;)

a wireless session close process unit for performing a wireless session close process when the wireless session close timer is expired (in other words, when it is notified by the timer unit that expiration is detected); and a control unit for controlling the wireless session close process unit to hold the wireless session close process activated based on expiration of the wireless session close timer until reception of broadcast/multicast is completed, in case that it is determined that data distributed by the broadcast/multicast is being received when the wireless session close timer is expired.

In addition, the wireless communication apparatus executes the wireless session close process by releasing the holding after reception of data distributed by the broadcast/multicast is completed.

In the wireless communication apparatus according to a embodiment of the present invention, the wireless session close process is an UATI reacquisition process and/or session configuration process.

In the above description, the means for solving the problem according to the present invention has been discussed as apparatus. However, the present invention can also be implemented as a method, a program, and a recording medium for storing the program substantially corresponding to such apparatus. Therefore it will be understood that such modification and variations are considered to fall within the scope of the invention.

Effect of the Invention

According to the present invention, it is possible to complete a broadcast/multicast reception process normally since a channel is not switched during reception of broadcast/multicast by holding a wireless session close process. Therefore, it is possible to improve a reception success rate of broadcast/multicast.

DESCRIPTION OF EMBODIMENTS

Preferred embodiments of the present invention will now be described with reference to the accompanying drawings. While a wireless communication apparatus according to the present invention includes various apparatus such as a cellular phone, a PDA having a wireless function, a wireless communication card and the like, the present invention will be described with reference to embodiments of a cellular phone, which is a typical example of the wireless communication apparatus.

Figure 1:
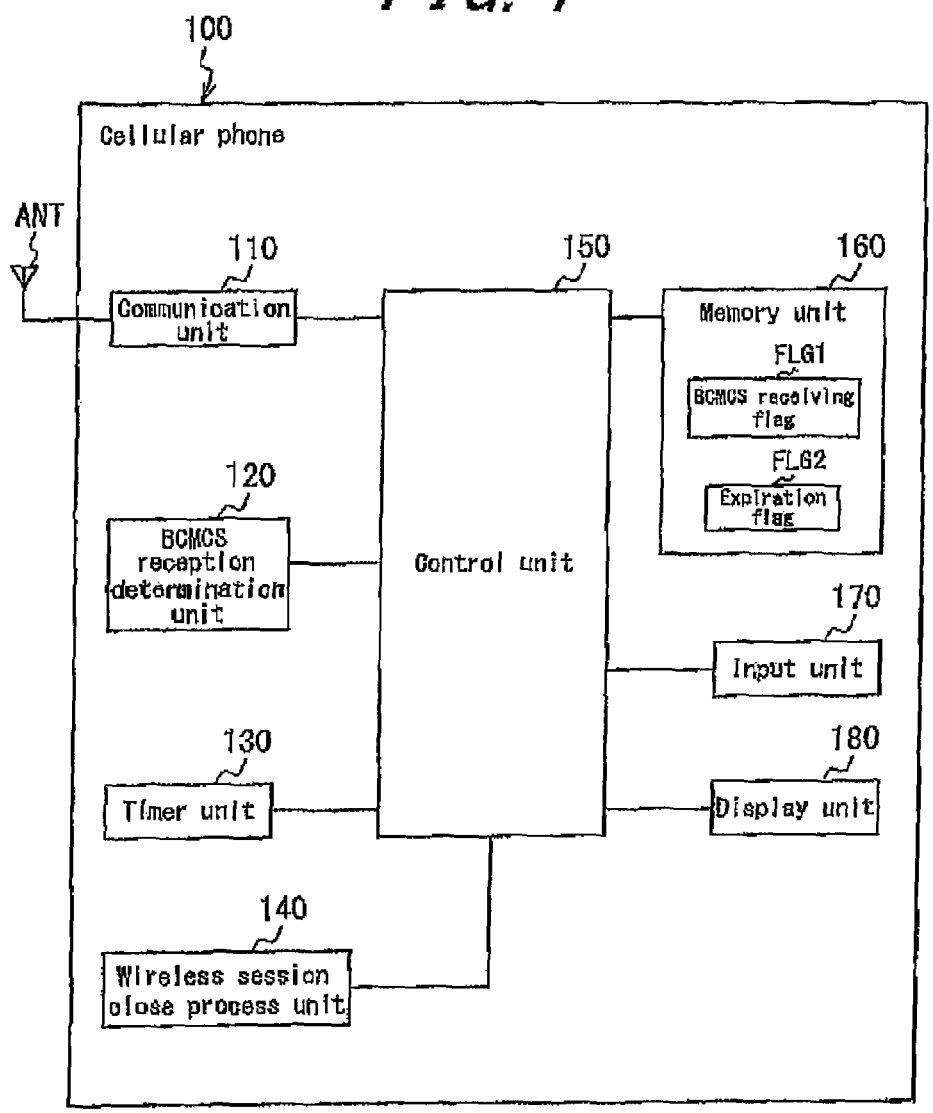
FIG. 1 is a block diagram illustrating a configuration of a cellular phone according to the present invention.

FIG. 1 is a block diagram illustrating a configuration of a cellular phone according to the present invention. As shown in FIG. 1, the cellular phone 100 has a communication unit 110, a BCMCS (broadcast/multicast) reception determination unit 120, a timer unit 130, a wireless session close process unit 140, a control unit 150, a memory unit 160, an input unit 170 and a display unit 180. The communication unit 110 receives BCMCS, or receives data communication or telephone call through an antenna ANT. The BCMCS reception determination unit (monitoring unit) 120 determines (monitors) whether the communication unit 110 is receiving BCMCS or not. When the BCMCS reception determination unit 120 determines that the communication unit 110 is receiving BCMCS, it notifies the control unit 150 which controls the apparatus as a whole that the BCMCS is being received. The control unit 150 which received the notification turns on a BCMCS receiving flag FLG1 indicating that BCMCS is being received in the memory unit 160. When the BCMCS reception determination unit 120 determines that the communication unit 110 is not receiving BCMCS, the control unit 150 indicates that the reception is completed by turning off the BCMCS receiving flag FLG1.

The timer unit 130 detects that the wireless session close timer enabled when PPP session is terminated is expired, and notifies the wireless session close process unit 140 of the detection. At the same time, the timer unit 130 first transfers the expiration of the timer to the control unit 150, and the control unit 150 turns on an expiration flag FLG2 (whose on status means expiration) indicating expiration of the wireless session close timer and being provided in the memory unit 160.

The wireless session close process unit 140 notified that the wireless session close timer is expired by the timer unit 130 holds (delay) the wireless session close process until the BCMCS receiving flag FLG1 is turned off. More specifically, the control unit 150 controls the wireless session close process unit 140 to hold (delay) the wireless session close process which is activated based on the expiration of the wireless session close timer until the BCMCS receiving flag FLG1 indicating that BCMCS is being received is turned off, when the expiration flag FLG2 indicating expiration of the wireless session close timer is turned on. By holding (delaying) the wireless session close process, it is possible to certainly prevent BCMCS reception from being failed due to activation of a timer of the close process.

Figure 2:
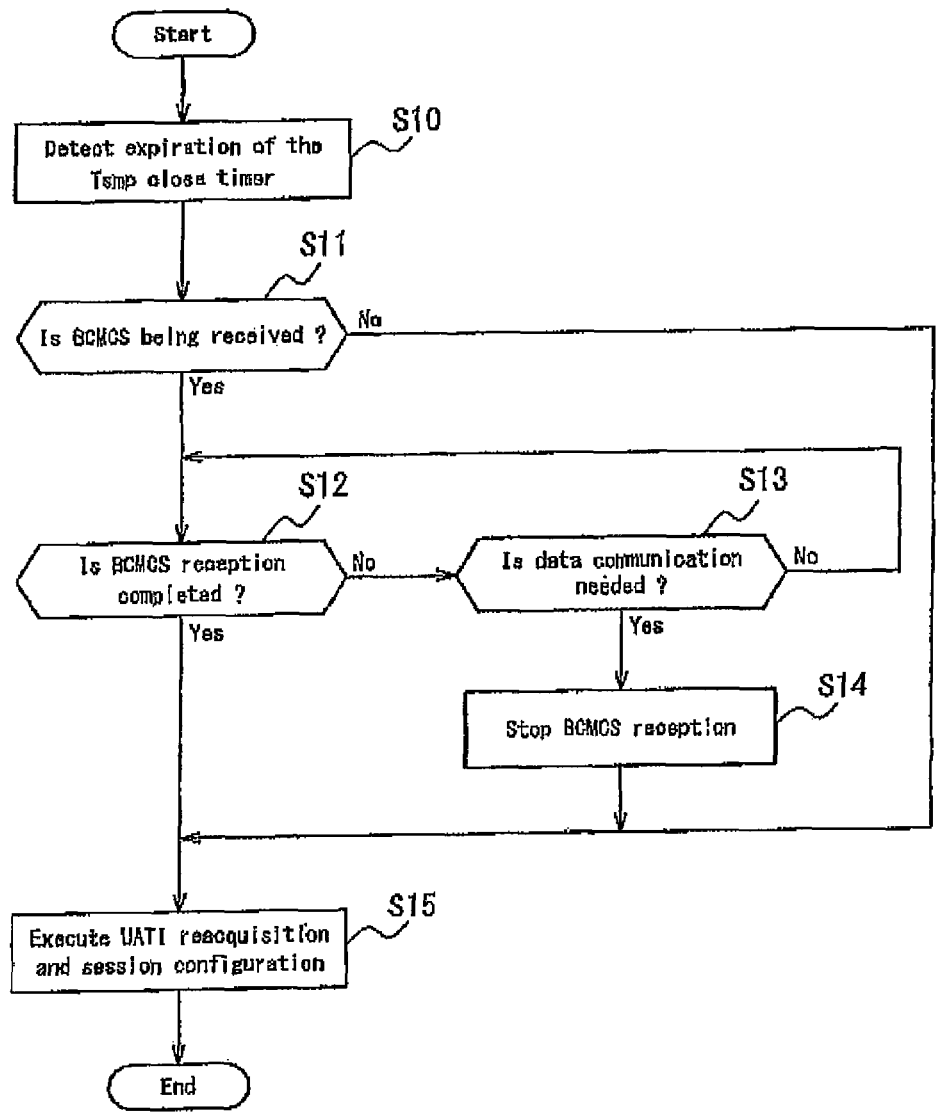
FIG. 2 is a flow chart illustrating an exemplary process of the wireless communication apparatus according to the present invention.

FIG. 2 is a flow chart illustrating an exemplary process of the wireless communication apparatus according to the present invention. As shown in FIG. 2, the control unit 150 detects that the session close process timer (Tsmp close timer) is expired at step S10. At step S11, the control unit 150 determines whether BCMCS is being received or not by referring to the BCMCS receiving flag FLG1 provided in the memory unit 160. When it is determined that the BCMCS receiving flag FLG1 is turned off (i.e., the BCMCS is not being received) at step S11, the process proceeds step S15, and the control unit 150 controls the wireless session close process unit 140 to execute the session close process "UATI reacquisition, session configuration" and completes the process.

When it is determined that the BCMCS receiving flag FLG1 is turned on (i.e., the BCMCS is being received) at step S11, the process proceeds step S12, and the control unit 150 determines whether the BCMCS reception is completed or not by referring to the BCMCS receiving flag FLG1 in the memory unit 160. When it is determined that the BCMCS reception is completed (i.e., the flag is turned off) at step S12, the process proceeds step S15 and the close process described above is performed. And, the process ends. When it is determined that the BCMCS reception is not completed at step S12, the process proceeds step S13 and it is determined whether data communication is needed or not. The determination whether data communication is needed or not is performed based on whether there are cases that a signal of data communication is received or a user does a sending operation using the input unit 170. When it is determined that data communication is not needed at step S13, the process returns to step S12. When it is determined that data communication is needed at step S13, the process proceeds to step S14 and BCMCS reception is stopped.

Since it is not necessary to perform a kind of initial setting process included the wireless session close process such as UATI reacquisition/session configuration in BCMCS reception, holding or delaying the wireless session close process does not affect BCMCS reception.

Figure 3:
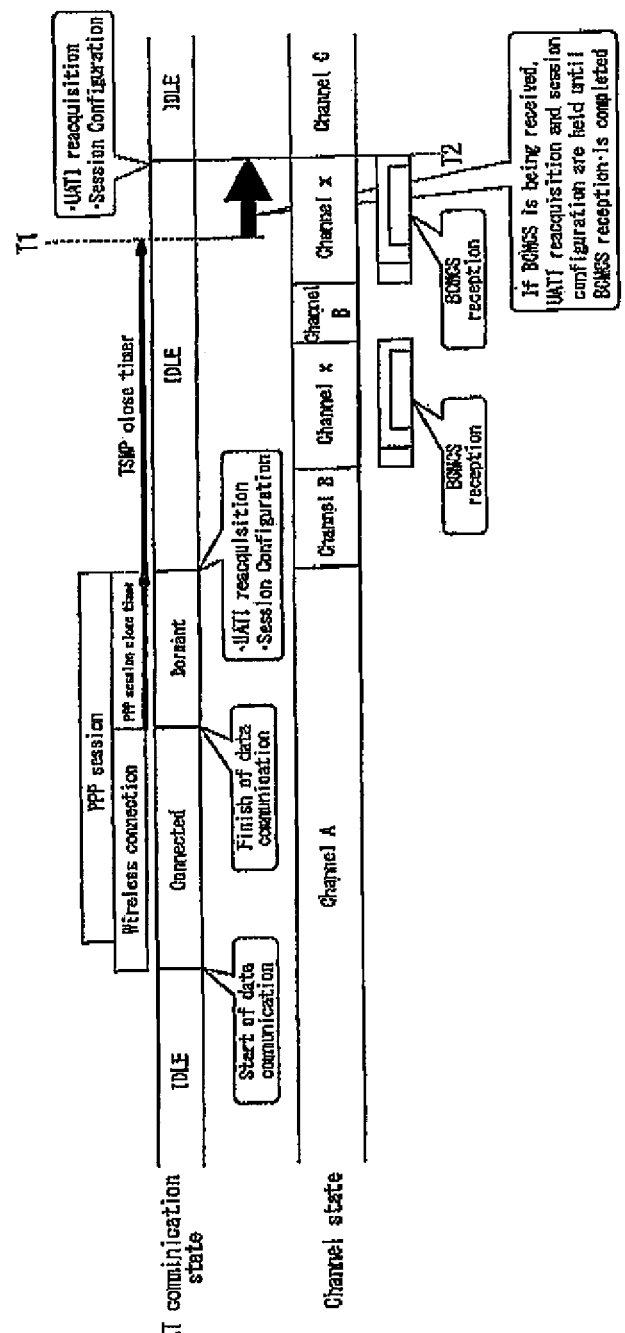
FIG. 3 is a time chart illustrating an exemplary process of the wireless communication apparatus according to the present invention when a wireless session close process timer is expired during reception of BCMCS.
Figure 4:
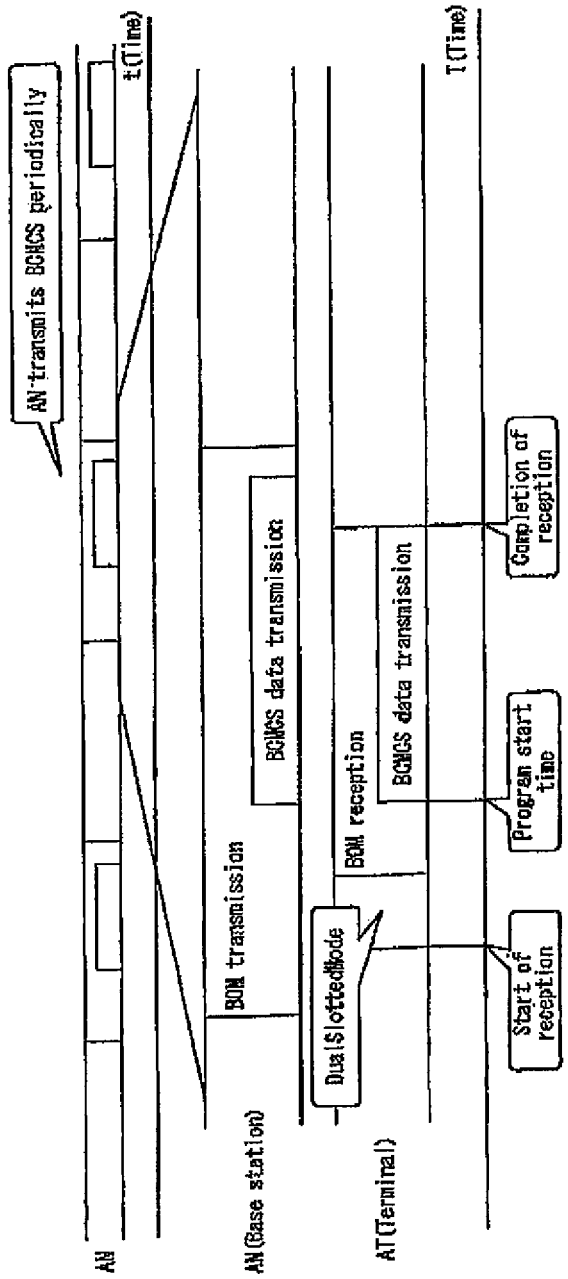
FIG. 4 is a time chart illustrating a basic operation for receiving BCMCS in the conventional art.
Figure 5:
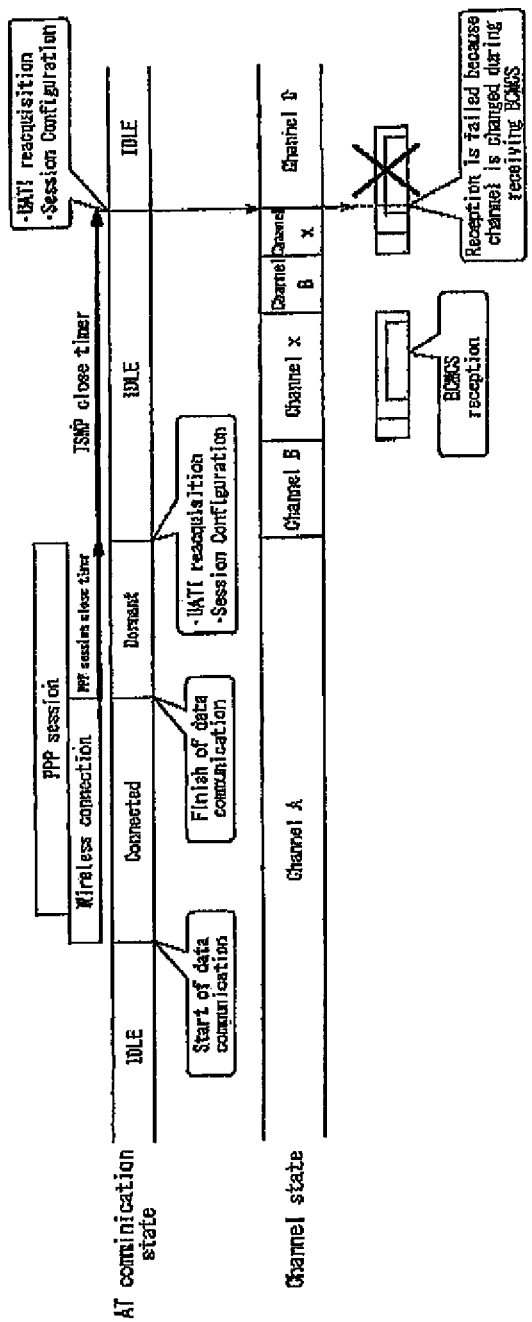
FIG. 5 is a time chart illustrating a flow in which BCMCS reception fails in the conventional art.

FIG. 3 is a time chart illustrating an exemplary process of the wireless communication apparatus according to the present invention when the wireless session close process timer is expired during reception of BCMCS. As shown in FIG. 3, BCMCS data is received through channel x. The first BCMCS data is normally received and the wireless session close process timer (Tsmp close timer) is expired at time T1 when the second BCMCS is being received. In the conventional art, the session close process "UATI reacquisition and session configuration" is executed by the wireless session close process immediately activated based on expiration of the wireless session close process timer at time T1, and therefore, BCMCS reception is failed. However, according to the preset invention, in case that BCMCS is being received when the wireless session close process timer is expired (i.e., at time T1), the wireless session close process "UATI reacquisition and session configuration" is held (delayed) until time T2 where the BCMCS reception is completed, as shown in FIG. 3. The holding process is performed by making a task for performing the wireless session close process wait or the like. In this way, since "the channel x for BCMCS reception" is not switched to "another channel C" during reception of BCMCS, the BCMCS reception process can be normally completed.

While the invention has been described with reference to exemplary embodiments and drawings, it will be understood by those skilled in the art that many various modifications and extensions may be implemented using the teaching of this invention. All such modifications and extensions are intended to be included within the true spirit and scope of the present invention. For example, each element, each unit, function included in each step and the like can be rearranged not to be contradictory logically. And, a plurality of units, steps and the like can be combined or divided. For example, in the embodiment, flags are provided in the memory unit and transfer information indicating that data is being received or a timer is expired, but each unit may transfer such information with predetermined signal.

The invention claimed is:

1. A wireless communication apparatus that performs a wireless session close process when a wireless session close timer is expired, comprising:
   a controller that
   determines whether data distributed by broadcast/multicast is being received or not; and
   controls the wireless communication apparatus to hold the wireless session close process until reception of broadcast/multicast is completed, in case that it is determined that the data distributed by the broadcast/multicast is being received when the wireless session close timer is expired.

2. The wireless communication apparatus according to claim 1, wherein the wireless session close process is an UATI reacquisition process and/or a session configuration process.

* * * * *